(12) United States Patent
Fernholz et al.

(10) Patent No.: US 12,442,303 B1
(45) Date of Patent: Oct. 14, 2025

(54) METHOD OF MITIGATING ROTOR BOW IN A TURBINE ENGINE ROTOR

(71) Applicant: General Electric Company, Schenectady, NY (US)

(72) Inventors: Christian M. Fernholz, Liberty Township, OH (US); Clay Sven Norrbin, Liberty Township, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/631,471

(22) Filed: Apr. 10, 2024

(51) Int. Cl.
*F01D 5/10* (2006.01)
*F01D 19/02* (2006.01)

(52) U.S. Cl.
CPC ............ *F01D 5/10* (2013.01); *F01D 19/02* (2013.01); *F05D 2260/85* (2013.01)

(58) Field of Classification Search
CPC .................................. F01D 19/02; F01D 5/10
See application file for complete search history.

(56) References Cited

U.S. PATENT DOCUMENTS

| | | | |
|---|---|---|---|
| 7,742,881 B2 | 6/2010 | Muralidharan et al. | |
| 9,347,321 B2 | 5/2016 | Heidari et al. | |
| 10,040,577 B2 | 8/2018 | Teicholz et al. | |
| 10,260,527 B2 | 4/2019 | Steen | |
| 10,358,936 B2 * | 7/2019 | Hockaday | F01D 19/02 |
| 10,443,507 B2 | 10/2019 | Schwarz et al. | |
| 10,724,443 B2 | 7/2020 | Hon et al. | |
| 10,781,754 B2 | 9/2020 | Chiasson et al. | |
| 2021/0079792 A1 | 3/2021 | Li | |
| 2022/0034228 A1 | 2/2022 | Auduberteau et al. | |

FOREIGN PATENT DOCUMENTS

| | | | |
|---|---|---|---|
| FR | 3127024 A1 | 3/2023 | |
| FR | 3127025 A1 | 3/2023 | |

* cited by examiner

*Primary Examiner* — Michael L Sehn
(74) *Attorney, Agent, or Firm* — Venable LLP; Duarte Y Ho; Michele V. Frank

(57) ABSTRACT

A method of mitigating rotor bow in a rotor of a turbine engine. The method includes determining thermal rotor bow in the rotor, determining non-thermal rotor unbalance in the rotor by monitoring the response at the bowed rotor mode of the rotor, and determining a time period for motoring the rotor prior to operation of turbine engine, wherein the time period is based on a combination of the thermal rotor bow and the non-thermal rotor unbalance. The method also includes motoring the rotor for the time period and until the vibration of the rotor is below a predetermined acceptable value.

20 Claims, 5 Drawing Sheets

METHOD OF MITIGATING ROTOR BOW IN A TURBINE ENGINE ROTOR

TECHNICAL FIELD

The present disclosure relates generally to a method of mitigating rotor bow, for example, in a turbine engine.

BACKGROUND

A turbine engine, for example, for an aircraft, generally includes a fan and a core section arranged in flow communication with one another. The turbine engine includes one or more rotors that rotate or support rotation of other components of the turbine engine.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
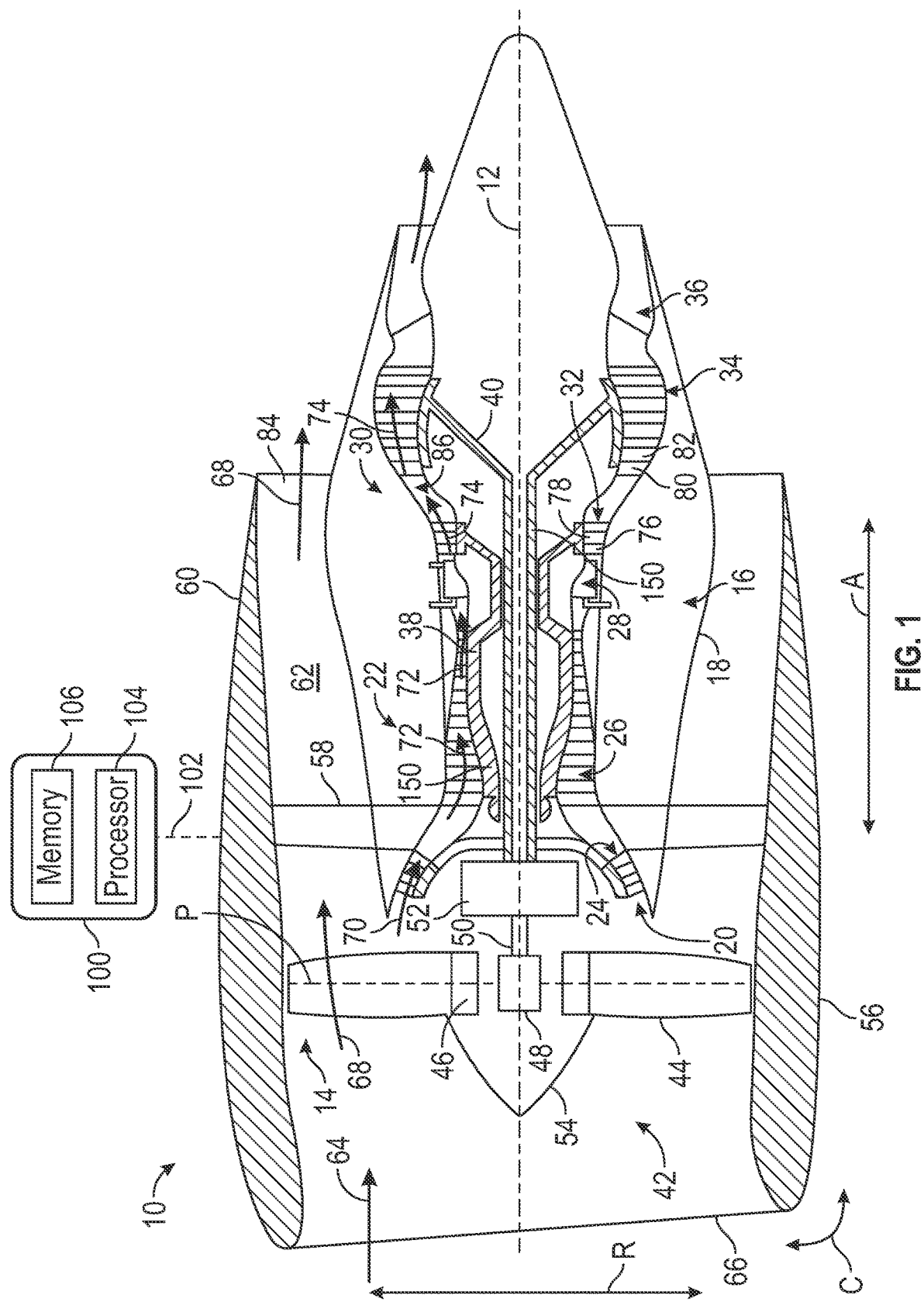
FIG. 1 illustrates a schematic cross-sectional view of a turbine engine, taken along a longitudinal centerline axis of the engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first" and "second," and the like, may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level"), or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein. The terms include integral and unitary configurations (e.g., blisk rotor blade systems).

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

As used herein, "bowed rotor mode" refers to the first bending mode of the rotor. When the rotor is the high pressure (HP) shaft, the bowed rotor mode refers to the first mode of the HP shaft.

As used herein, "thermal rotor bow" refers to deformation of the rotor due to unequal heating of the upper surface or top side of the rotor (as compared to the ground surface) and lower surface or bottom side of the rotor (as compared to the ground surface). As used herein, "non-thermal rotor unbalance" or "non-thermal effects" refer to unbalance that may be present in the rotor and is not due to thermal effects. As used herein, "permanent rotor bow" refers to permanent deformation of the rotor due to thermal rotor bow.

The present disclosure provides for a method of mitigating the response of a rotor to unbalance loads from thermal rotor bow as well as and non-thermal rotor unbalance. The thermal rotor bow is attributed to heat generation in the engine and retention in the rotor. The non-thermal rotor unbalance includes unbalance due to mass eccentricity (or eccentricity unbalance), and permanent rotor deformations (also referred to herein as residual unbalance). The present disclosure provides for a method of determining the amount of the thermal rotor bow and the amount of the non-thermal rotor unbalance, and for controlling the mitigation activities (e.g., motoring of the rotor) based on both the thermal rotor bow and the non-thermal rotor unbalance, as well as other engine properties (e.g., damper oil temperatures).

Referring now to the drawings, FIG. 1 is a schematic cross-sectional view of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference), a radial direction R that is normal to the axial direction A, and a circumferential direction C extending about the longitudinal centerline axis 12. In general, the turbine engine 10 includes a fan section 14 and a turbo-engine 16 disposed downstream from the fan section 14.

The turbo-engine 16 includes, in serial flow relationship, a compressor section 22, a combustion section 28, and a turbine section 30. The turbo-engine 16 is substantially enclosed with an outer casing 18 that is substantially tubular and defines an annular inlet 20. As schematically shown in FIG. 1, the compressor section 22 includes a booster or a low pressure (LP) compressor 24 followed downstream by a high pressure (HP) compressor 26. The combustion section 28 is downstream of the compressor section 22. The turbine section 30 is downstream of the combustion section 28 and includes a high pressure (HP) turbine 32 followed downstream by a low pressure (LP) turbine 34. The turbo-engine 16 further includes a jet exhaust nozzle section 36 that is downstream of the turbine section 30, a high-pressure (HP) shaft 38 or a spool, and a low-pressure (LP) shaft 40. The HP shaft 38 drivingly connects the HP turbine 32 to the HP compressor 26. The HP turbine 32 and the HP compressor 26 rotate in unison through the HP shaft 38. The LP shaft 40 drivingly connects the LP turbine 34 to the LP compressor 24. The LP turbine 34 and the LP compressor 24 rotate in unison through the LP shaft 40. The compressor section 22, the combustion section 28, the turbine section 30, and the jet exhaust nozzle section 36 together define a core air flow path.

For the embodiment depicted in FIG. 1, the fan section 14 includes a fan 42 (e.g., a variable pitch fan) having a plurality of fan blades 44 coupled to a disk 46 in a spaced apart manner. As depicted in FIG. 1, the fan blades 44 extend outwardly from the disk 46 generally along the radial direction R. In the case of a variable pitch fan, the plurality of fan blades 44 are rotatable relative to the disk 46 about a pitch axis P by virtue of the fan blades 44 being operatively coupled to an actuation member 48 configured to collectively vary the pitch of the fan blades 44 in unison. The fan blades 44, the disk 46, and the actuation member 48 are together rotatable about the longitudinal centerline axis 12 via a fan shaft 50 that is powered by the LP shaft 40 across a power gearbox, also referred to as a gearbox assembly 52. In this way, the fan 42 is drivingly coupled to, and powered by, the turbo-engine 16 and the turbine engine 10 is an indirect drive engine. The gearbox assembly 52 is shown schematically in FIG. 1. The gearbox assembly 52 is a reduction gearbox assembly for adjusting the rotational speed of the fan shaft 50 and, thus, the fan 42 relative to the LP shaft 40 when power is transferred from the LP shaft 40 to the fan shaft 50.

Referring still to the exemplary embodiment of FIG. 1, the disk 46 is covered by a rotatable fan hub 54 aerodynamically contoured to promote an airflow through the plurality of fan blades 44. In addition, the fan section 14 includes an annular fan casing or a nacelle 56 that circumferentially surrounds the fan 42 and at least a portion of the turbo-engine 16 by a plurality of outlet guide vanes 58 that are circumferentially spaced about the nacelle 56 and the turbo-engine 16. Moreover, a downstream section 60 of the nacelle 56 extends over an outer portion of the turbo-engine 16, and, with the outer casing 18, defines a bypass airflow passage 62 therebetween.

During operation of the turbine engine 10, a volume of air 64 enters the turbine engine 10 through an inlet 66 of the nacelle 56 or the fan section 14. As the volume of air 64 passes across the fan blades 44, a first portion of air 68, also referred to as a bypass air 68, is routed into the bypass airflow passage 62, and a second portion of air 70, also referred to as core air 70, is routed into the upstream section of the core air flow path through the annular inlet 20 of the LP compressor 24. The ratio between the bypass air 68 and the core air 70 is commonly known as a bypass ratio. The pressure of the core air 70 is then increased, generating compressed air 72. The compressed air 72 is routed through the HP compressor 26 and into the combustion section 28, wherein the compressed air 72 is mixed with fuel and ignited to generate combustion gases 74.

The combustion gases 74 are routed into the HP turbine 32 and expanded through the HP turbine 32 where a portion of thermal energy and kinetic energy from the combustion gases 74 is extracted via one or more stages of HP turbine stator vanes 76 and HP turbine rotor blades 78 that are coupled to the HP shaft 38. This causes the HP shaft 38 to rotate, thereby supporting operation of the HP compressor 26 (self-sustaining cycle). In this way, the combustion gases 74 do work on the HP turbine 32. The combustion gases 74 are then routed into the LP turbine 34 and expanded through the LP turbine 34. Here, a second portion of thermal energy and the kinetic energy is extracted from the combustion gases 74 via one or more stages of LP turbine stator vanes 80 and LP turbine rotor blades 82 that are coupled to the LP shaft 40. This causes the LP shaft 40 to rotate, thereby supporting operation of the LP compressor 24 (self-sustaining cycle) and rotation of the fan 42 via the gearbox assembly 52. In this way, the combustion gases 74 do work on the LP turbine 34.

The combustion gases 74 are subsequently routed through the jet exhaust nozzle section 36 of the turbo-engine 16 to provide propulsive thrust. Simultaneously, the bypass air 68 is routed through the bypass airflow passage 62 before being exhausted from a fan nozzle exhaust section 84 of the turbine engine 10, also providing propulsive thrust. The HP turbine 32, the LP turbine 34, and the jet exhaust nozzle section 36 at least partially define a hot gas path 86 for routing the combustion gases 74 through the turbo-engine 16.

The turbine engine 10 may be communicatively and operatively coupled to an engine controller 100 along a communication line 102. The engine controller 100 is configured to operate various aspects of the turbine engine 10. The engine controller 100 may be a Full Authority Digital Engine Control (FADEC). In this embodiment, the engine controller 100 is a computing device having one or more processors 104 and one or more memories 106. The processor 104 may be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA).

The memory 106 may include one or more computer-readable media, including, but not limited to, non-transitory computer-readable media, a computer-readable non-volatile medium (e.g., a flash memory), a RAM, a ROM, hard drives, flash drives, and/or other memory devices.

The memory 106 may store information accessible by the processor 104, including computer-readable instructions that may be executed by the processor 104. The instructions may be any set of instructions or a sequence of instructions that, when executed by the processor 104, causes the processor 104 and the engine controller 100 to perform operations. In some embodiments, the instructions may be executed by the processor 104 to cause the processor 104 to complete any of the operations and functions for which the engine controller 100 is configured, as will be described further below. The instructions may be software written in any suitable programming language, or may be implemented in hardware. Additionally, and/or alternatively, the instructions may be executed in logically and/or virtually separate threads on the processor 104. The memory 106 may further store data that may be accessed by the processor 104.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

The engine controller 100 may be communicatively coupled to one or more sensors employed in the methods of the present disclosure, such as, for example, vibration sensors (such as accelerometers), temperature sensors, speed sensors, and other sensors within the turbine engine 10. For example, the engine controller 100 may receive, and optionally store or record, data or information from the one or more sensors. The engine controller 100 may also control motoring of the turbine engine (e.g., rotation of the rotor described in more detail to follow).

The turbine engine 10 depicted in FIG. 1 is by way of example only. In other exemplary embodiments, the turbine engine 10 may have any other suitable configuration. For example, in other exemplary embodiments, the fan 42 may be configured in any other suitable manner (e.g., as a variable pitch fan or a fixed pitch fan) and further may be supported using any other suitable fan frame configuration. Moreover, in other exemplary embodiments, any other suitable number or configuration of compressors, turbines, shafts, or a combination thereof may be provided. In other exemplary embodiments, the engine may also be a direct drive engine, which does not have a power gearbox (e.g., no gearbox assembly 52). The fan speed is the same as the LP shaft speed for a direct drive engine. In still other exemplary embodiments, aspects of the present disclosure may be incorporated into any other suitable turbine engine, such as, for example, turbofan engines, propfan engines, turboprop engines, unducted engines, or turboshaft engines.

Figure 2A:
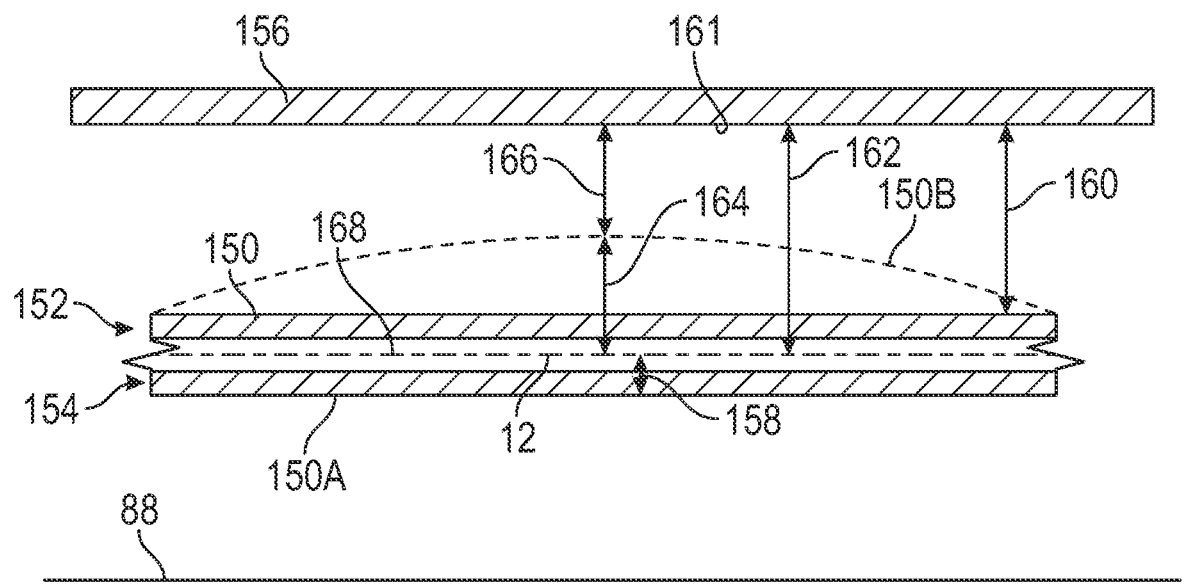
FIG. 2A illustrates a schematic cross-sectional view of a rotor for the turbine engine of FIG. 1, taken along a longitudinal centerline axis of the engine, according to the present disclosure.
Figure 2B:
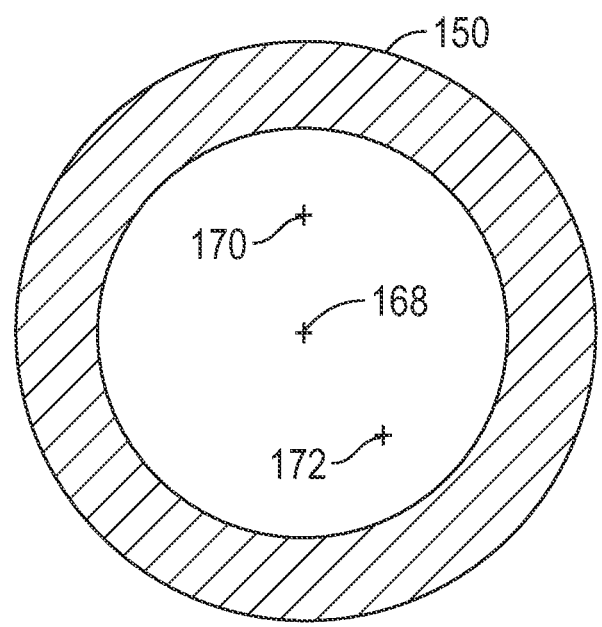
FIG. 2B illustrates a schematic cross-sectional view of the rotor of FIG. 2A taken along an axis perpendicular to the longitudinal centerline axis of the engine, according to the present disclosure.

Referring to FIGS. 2A and 2B, during operation of the turbine engine 10 (FIG. 1), as discussed above, each of the LP shaft 40 and the HP shaft 38 rotates. Accordingly, for the purposes of this disclosure, the LP shaft 40 and the HP shaft 38 may each by referred to as a rotor 150. When the rotor 150 rotates during operation of the turbine engine 10, the rotor 150 is substantially straight, that is, substantially parallel to the longitudinal centerline axis 12, as shown by a straight condition 150A in FIG. 2A. After operation of the turbine engine 10 is complete (e.g., in aircraft, when flight or aircraft operation is complete), the turbine engine 10 is shutdown. When the turbine engine 10 is shutdown, there is residual heat remaining within the turbine engine 10. The heat tends to rise (with respect to a ground surface 88) within the turbine engine 10. This tendency of heat to rise causes the rotor 150 to be hotter, with respect to the ground surface 88, on a top side 152 rather than on a bottom side 154. The difference of temperature of the rotor 150 causes the rotor 150 to bow upward, with respect to the ground surface 88, as illustrated by a bowed condition 150B. This is referred to as thermal rotor bow or thermal bow.

The rotor 150 rotates with respect to a component 156, which may be a rotating or a non-rotating component. For example, when the rotor 150 is the HP shaft 38 (FIG. 1), the component may be a non-rotating component of the HP compressor 26. A rotational diameter 158 is the diameter created by rotation of the rotor 150 about the longitudinal centerline axis 12. A clearance 160 exists between the rotational diameter 158 of the rotor 150 and an inner diameter 162 of the component 156.

When the rotor 150 is straight or substantially straight (e.g., the straight condition 150A), the rotational diameter 158 may be substantially the same as the outer diameter of the rotor 150. When the rotor 150 is bowed (e.g., the bowed condition 150B), a rotational diameter 164 of the rotor 150 is defined by a distance between the longitudinal centerline axis 12 and the diameter created by an apex of the bow of the rotor 150. Accordingly, a clearance 166 exists between the rotational diameter 164 of the rotor 150 in the bowed condition 150B and the inner diameter 162 of the component 156. The rotational diameter 164 is greater than the rotational diameter 158. This results in the clearance 166 being less than the clearance 160. The effect of the clearance becoming lesser as the rotor 150 becomes bowed is referred to as clearance closure. The clearance closure is the process by which the available clearance (e.g., the clearance 160) between the rotor 150 and the component 156 is reduced. This reduction is often due to dynamic amplification of unbalance in the rotor 150 (e.g., as illustrated by the clearance 166). If the clearance 166 is reduced to zero, the outer surface of rotor 150 (in the bowed condition 150B) may come in contact with an inner surface 161 of the component 156. This may result in damage to one or both of the rotor 150 or the component 156. Even if the clearance 166 remains larger than zero, the vibration response of the turbine engine 10 to the bowed condition 150B may be large enough to cause damage to one or both of the rotor 150 or the component 156.

The rotor 150 may also have non-thermal rotor unbalance due to factors other than thermal rotor bow that affect the vibrational response, the clearance closure response, or both. One such example is residual unbalance, referred to herein as eccentricity unbalance, mass unbalance, non-thermal rotor bow, or non-thermal rotor unbalance. Eccentricity unbalance is described in connection with FIG. 2B. Referring to FIG. 2B, the rotor 150 has a geometric center 168 that aligns with a longitudinal centerline axis through the rotor 150. If the center of mass aligns with the geometric center 168, there are no unbalance forces due to mass unbalance and no mass eccentricity. If the center of mass does not align with the geometric center 168, there are unbalance forces due to mass eccentricity. The eccentricity unbalance is not dependent on the presence of thermal rotor bow and may be present when no thermal rotor bow is present in the rotor 150. If thermal rotor bow is present, however, the phase of any residual, non-thermal rotor unbalance in the rotor relative to any thermal rotor bow can affect the dynamic response of the engine to the combined unbalances. In-phase mass eccentricity refers to a center of mass of the rotor 150, for example, a center of mass 170 being in-phase or aligned with the direction of the thermal rotor bow. For example, as discussed with respect to FIG. 2A, the rotor 150 bows vertically upward with respect to the ground surface 88. When the rotor 150 exhibits in-phase mass eccentricity, the center of mass 170 is substantially aligned with the vertically upward direction of the thermal rotor bow. Out-of-phase eccentricity refers to a center of mass of the rotor 150, for example, a center of mass 172 being out-of-phase or not aligned with the direction of the thermal rotor bow. For example, as discussed, when the rotor 150 bows vertically upward with respect to the ground surface 88, the center of mass 172 is not aligned in that direction. Whether the mass eccentricity is in-phase or out-of-phase with the thermal rotor bow is based on where the rotor 150 is stopped at cessation of the turbine engine 10 and, therefore, may change during each shutdown of the turbine engine 10.

Figure 3:
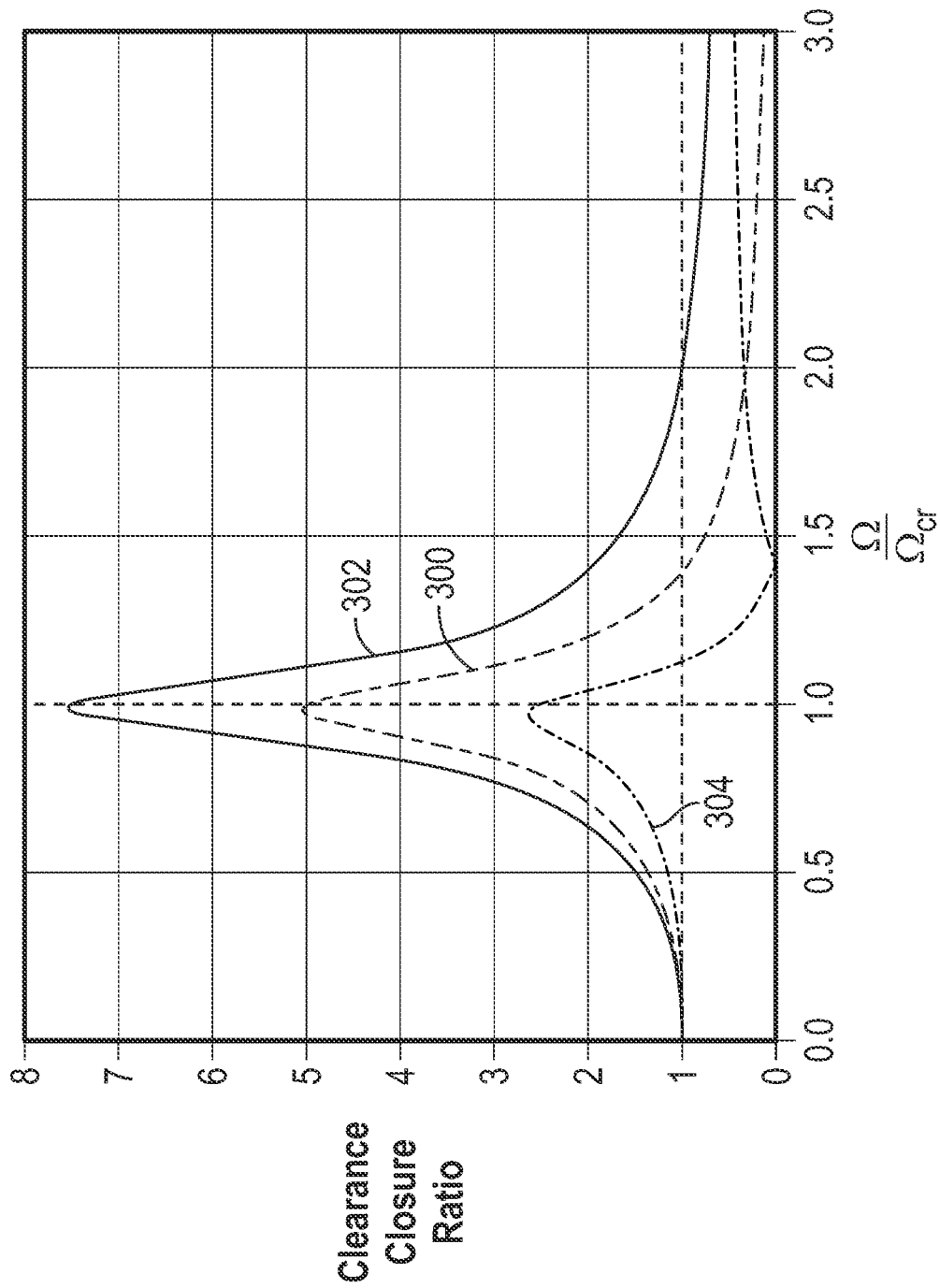
FIG. 3 is a graph illustrating a normalized clearance closure response for different rotors, according to the present disclosure.

The residual unbalance of the rotor 150 affects the vibrational response and the clearance closure response of the rotor 150, and, thus, affects the method of mitigating the bowed condition 150B (FIG. 2A), as will be described in more detail with respect to FIGS. 4 and 5. For example, FIG. 3 is a graph illustrating a clearance closure ratio as a function of rotor rotation speed 22 and the frequency of the rotor first bending mode $\Omega_{cr}$. FIG. 3 is a graph illustrating three exemplary rotors. A rotor 300 has thermal rotor bow and no mass eccentricity. As illustrated, the rotor 300 exhibits a clearance closure ratio of about five. A rotor 302 has the same thermal rotor bow and damping as the rotor 300, but the thermal rotor bow is located such that the thermal rotor bow is in-phase with other non-thermal rotor unbalance present in the rotor. As illustrated in FIG. 3, for the same thermal rotor bow and rotor damping, the rotor 302, with a mass eccentricity in-phase with the thermal rotor bow, exhibits a larger clearance closure ratio (in this example, a factor of about seven) as compared to the rotor 300 with no mass eccentricity. A similar effect can be seen in the vibrational response as well. Finally, a rotor 304 has the same thermal rotor bow and damping as in the rotor 300, but also has residual unbalance that is out-of-phase with the thermal rotor bow. In such a condition, the mass eccentricity operates to counterbalance the thermal rotor bow, reducing the clearance closure ratio exhibited by both the rotor 302 and the rotor 304 at the bowed rotor mode (a factor of approximately 2.5 in this example).

In other words, for cases when there is no residual unbalance (e.g., rotor 300), or the residual unbalance is small with respect to the thermal rotor bow unbalance, mitigation requirements are relatively straight-forward. The rotor bow can be estimated based on engine shutdown time and engine thermal state. The amplification factor is known, and vibration can be monitored to optimize motoring times. Such situations, however, are unlikely, as this requires a perfectly mass balanced rotor (e.g., a rotor having a center of mass and the same location as the geometric center). For engines having a relatively high level of residual unbalance (e.g., rotor 302 and rotor 304), the response of the engine at the bowed rotor mode can vary significantly, depending on the relative phasing of the residual and thermal rotor bow unbalances. When the unbalances are aligned (phase angles at or near 0°; e.g., rotor 302), the unbalance response can be significantly higher as compared to when unbalances are out-of-phase (phases angles at or near 180°, e.g., rotor 304), when the unbalance response may be significantly lower. Additionally, for cases when residual unbalance is higher than rotor bow unbalance, the change in the unbalance response may become even more pronounced.

To address the issue of non-thermal rotor unbalance phasing with respect to the thermal rotor bow in the present disclosure, the amount of rotor residual unbalance, and optionally, also the phase angle, are quantified and then accounted for in the rotor bow mitigation strategy (e.g., the length of motoring is a function of these factors and is controlled based on the quantification of thermal rotor bow and non-thermal rotor unbalances). Accordingly, the present disclosure provides for determining the amount of non-thermal rotor unbalance present in the rotor 150, by way of determining the amount of residual unbalance and controlling the mitigation activities (e.g., motoring) based on both the thermal rotor bow and the non-thermal rotor unbalance.

With reference to FIGS. 1 and 2A and 2B, after shutdown of the turbine engine 10, the turbine engine 10 cannot be operated until the bowed condition 150B is resolved. That is, before the turbine engine 10 can be operated again, and, thus, before rotation of the rotor 150 again, the rotor 150 must be allowed to return to the straight condition 150A or near the straight condition 150A (as established by predetermined acceptable levels of vibration and clearance closure). If the turbine engine 10 is operated with the rotor 150 in a bowed condition, the bowed portion of the rotor 150 operates as a large unbalance load on the rotor 150. The unbalance load leads to two issues: high vibrational levels and high clearance closures (both as compared to a straight rotor 150 in the straight condition 150A). The high vibrational levels may damage components within the turbine engine 10. The high clearance closure may result in rubbing of the rotor 150 on the component 156. That is, because the gap or the clearance 166 between the rotor 150 and the component 156 is lower (i.e., the clearance closes) during the bowed condition 150B, some portions of the rotor 150 may rub or contact portions of the component 156. The rubbing or contact may affect operability of the rotor 150, the component 156, or both. For example, when the component 156 is the HP compressor 26, rubbing may cause operability problems in the HP compressor 26, which may affect the overall operation and performance of the turbine engine 10.

One way to allow the rotor 150 to return to the straight condition 150A is by waiting (with the turbine engine 10 shutdown) until the rotor 150 cools down to a sufficient temperature that results in the bowed condition 150B no longer being present, at which time, the turbine engine 10 may again be placed in an operating condition. Solely waiting until the rotor 150 cools can take many hours and, in some instances, the engine operator may not have or may not want to wait sufficient time to allow the rotor 150 to cool to a point having the thermal rotor below in an acceptable range. The present disclosure provides methods of mitigating the unbalance response of the turbine engine 10 due to thermal rotor bow in combination with other factors, including residual (non-thermal) unbalance and damping.

Figure 4:
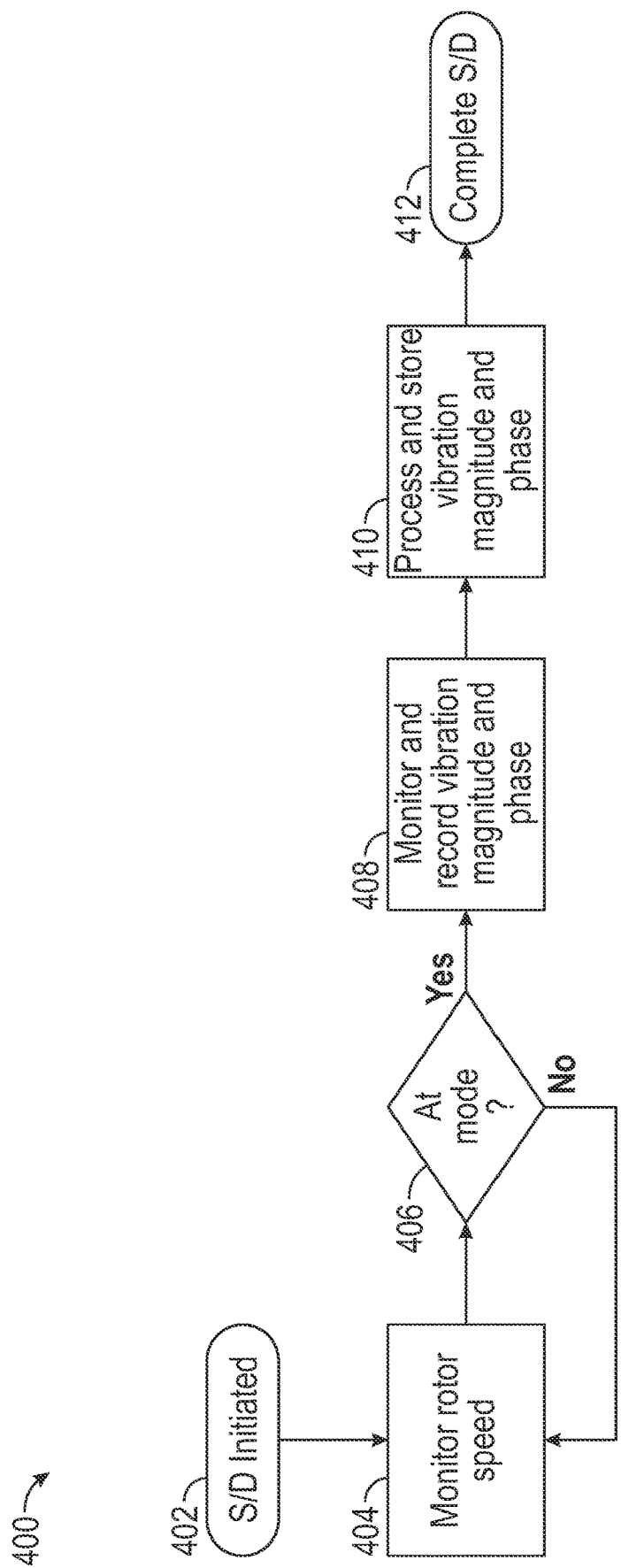
FIG. 4 illustrates a method of shutting down a turbine engine, according to the present disclosure.
Figure 5:
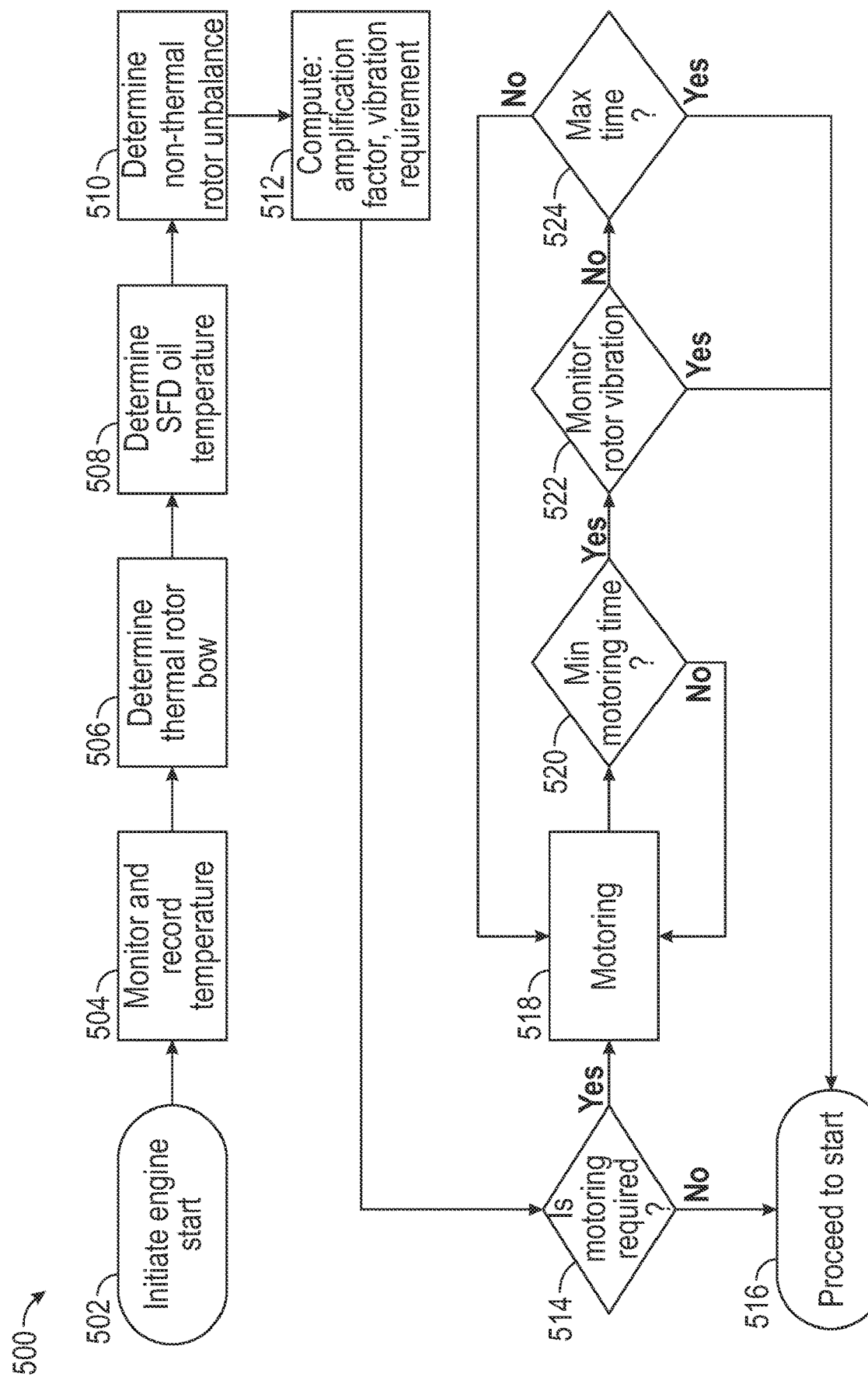
FIG. 5 illustrates a method of initiating a turbine engine, according to the present disclosure.

FIGS. 4 and 5, together, illustrate a method of mitigating rotor bow that includes a method 400 of shutting down a turbine engine, such as the turbine engine 10, and a method 500 of initiating the turbine engine 10. The method 400, the method 500, or both, may be carried out by the engine controller 100 (FIG. 1). That is, the memory 106 (FIG. 1) may store the recorded data or information obtained from the monitoring, historical data, trend data, experimental data, instructions, programs, or algorithms for carrying out the methods 400 and 500, and other information or data to compare calculated or monitored values to in order to determine the appropriate motoring time based on each monitored condition. The processor 104 (FIG. 1) may carry out the instructions, programs, algorithms, comparisons, and the like.

The first step in mitigating rotor bow is to monitor and to record certain parameters during shutdown of the turbine engine 10, such as illustrated in FIG. 4. The method 400 provides a quantification of the non-thermal rotor unbalance present in the turbine engine 10 by monitoring the vibration during the shutdown of the turbine engine 10. As the rotor 150 FIG. 2A) decelerates during the shutdown, the rotor 150 passes through the bowed rotor mode, and vibration magnitude and, optionally, the phase can be measured at the bowed rotor mode. The vibration and the phase recorded and stored (at step 408 and step 410) is attributed to only the non-thermal rotor unbalance (e.g., mass eccentricity). For the purposes of the method 400, since the turbine engine 10 has been operational with the rotor 150 continuously rotating, there is assumed to be or estimated to be no thermal rotor bow of the rotor 150 during the shutdown until after shutdown is completed.

The method 400 begins with initiating shutdown of the turbine engine 10 at step 402. During engine shutdown, step 404 monitors the speed of the rotor 150. That is, once the turbine engine 10 is shutdown, the rotor 150 continues to rotate as the rotor 150 decelerates from the operating speed to shut down. Step 404 monitors the speed of the rotor 150 from the moment the shutdown is initiated at least until the rotor 150 has passed the bowed rotor mode and, in some examples, until the rotor 150 stops rotating.

For cases when the bowed rotor mode is within the operating range of the engine (i.e., above ground idle speed) a similar method of vibration monitoring at the bowed rotor mode can be used to estimate non-thermal residual unbalance in the rotor.

The method 400 continues to monitor the speed of the rotor 150 through step 406. At 406, the method 400 determines if the rotor 150 has passed through the bowed rotor mode. As the rotor 150 decelerates (referred to as spooling down) from the operating speed to no rotation (e.g., zero speed), the rotor 150 will pass through the bowed rotor mode. If the rotor 150 has not yet passed through the bowed rotor mode ("No"), then step 404 continues and the speed of the rotor 150 continues to be monitored. As the rotor 150 reaches a speed corresponding to the bowed rotor mode ("Yes"), step 408 records a vibration magnitude of the rotor 150 and, optionally, a phase of the vibration when the rotor 150 is at the bowed rotor mode. The phase is measured with respect to a phase reference point on the rotor 150. The monitoring and the recording at step 408 may occur for a predetermined window, also referred to as a predetermined speed range, around the bowed rotor mode. The predetermined window may be about ten percent below and above the bowed rotor mode. When monitoring within the predetermined window, the peak magnitude of vibration within the predetermined window, and the associated phase of that peak magnitude, are attributable to non-thermal rotor unbalance and damper properties only, and provide a means of quantifying these characteristics directly in the absence of thermal rotor bow.

The method 400 measures and records the magnitude and the phase of the vibration when the rotor 150 is at the bowed rotor mode. The vibration magnitude may be measured on the turbine center frame, a forward bearing supporting the LP shaft 40 (FIG. 1), or combinations thereof. In some examples, the vibration magnitude is measured with one or more accelerometers mounted on the turbine center frame, with one or more accelerometers mounted on a forward bearing supporting the LP shaft 40, or a combination thereof. The measured vibration magnitude represents the vibration magnitude experienced by the rotor 150. Accordingly, measuring the vibration magnitude at the turbine center frame and the LP shaft 40 indicates vibration magnitude levels within the HP shaft 38 (FIG. 1) (when the HP shaft 38 is the rotor 150). Although step 408 describes monitoring and recording vibration magnitude and phase data, the method 400 may monitor and record other measurements, in addition to, or instead of, the vibration magnitude and phase data. For example, the clearance closure may be monitored with one or more clearanceometers.

At step 410, the vibration magnitude and the phase (or other measurements monitored and recorded at step 408) are processed and stored in the engine controller 100. The postprocessing may include, for example, determining trends, determining averages, storing historical data, etc. For example, the step 410 may average the current recorded vibration magnitude and phase with past values. In some cases, this may be a moving window of values (e.g., from the last fifty shutdowns). In some cases, outliers may be removed or accounted for to avoid skewing of the data. Then, this average value for each of vibration magnitude and phase may be employed in the method 500 (e.g., at step 510) as the quantification of non-thermal rotor unbalance. The postprocessing may include any methods that allow the method to determine a best estimate or best quantification of the non-thermal rotor unbalance to be implemented in the method 500. In some example, the algorithms for processing the data at step 410 may include the use of machine learning or artificial intelligence. For example, the machine learning or artificial intelligence may estimate the residual unbalance in a rotor, may evaluate overall damper health and performance, or combinations thereof. After postprocessing, an output is generated for use in the method 500.

The shutdown is complete at step 412 when engine rotation, including rotor 150 rotation, ceases completely.

In other words, the method 400 assesses residual rotor unbalance by monitoring vibration magnitude levels at the bowed rotor mode during engine shutdown. During shutdown, thermal rotor bow is non-existent, so the vibration magnitude response is due entirely to residual unbalance in the rotor and other non-thermal factors. Thus, monitoring during engine shutdown yields the unbalance response at the bowed rotor mode directly, rather than inferring what the response at the mode might be by monitoring vibration magnitude levels in the operating range. The vibration response at the bowed rotor mode is used to determine the amount of residual unbalance and other non-thermal effects in the rotor.

Accordingly, the method 400 of shutting down the engine determines non-thermal rotor unbalance present in the rotor 150. This information is combined with the thermal rotor bow in the rotor 150 (e.g., as determined by FIG. 5, at step 504 to step 508, as will be described in more detail to follow), to determine the required motoring time period prior to operation of the turbine engine 10.

The method 400 of FIG. 4 is one method to determine non-thermal rotor unbalance in the rotor. Another example involves monitoring the vibration magnitude and the phase during a cold start of a turbine engine. A cold start refers to initiating a turbine engine start after a period of non-operation such that the engine and the components therein (including the rotor) are at ambient temperature, with no thermal rotor bow of the rotor. In this manner, the method can capture any non-thermal rotor unbalance effects on the rotor during start-up of the engine. In some examples, a period of at least twelve hours to twenty four hours passes between engine shutdown and engine initiation for a cold start. When monitoring during a cold start, the method includes the same steps 404 to 410 as described with respect to FIG. 4. Regardless of when the unbalance due to non-thermal effects is determined (e.g., during shutdown or during cold start or other time), the monitoring and calculating of the non-thermal rotor unbalance occurs at a time when there is no thermal rotor bow or when there can be assumed to be no thermal rotor bow. Thus, the vibrational response monitored at this point in time reflects effects due only to non-thermal rotor unbalance factors.

The method 500 begins with initiating the turbine engine 10 at step 502. Initiating the turbine engine 10 includes rotating the rotor 150. The method 500, as will be described in more detail, determines the thermal rotor bow (step 504 to step 508) present in the rotor 150 and the non-thermal rotor unbalance (step 510) present in the rotor 150. As mentioned previously, the non-thermal rotor unbalance response includes effects due to damper health as well as mass eccentricity and non-thermal rotor unbalances.

At step 504, the method 500 monitors and records temperatures and, optionally, other parameters within the turbine engine 10. In some examples, the temperature is measured and recorded at one or more of the following temperatures: exhaust gas temperature, combustor inlet temperature, and ambient air temperature. In some examples, the length of time the engine has been shut down may be recorded. The temperatures and, if applicable, other parameters that are monitored and recorded are employed at step 506 to compute thermal rotor bow in the rotor 150. The computation at step 506 may compare the measured parameters to historical data or experimental data to determine the thermal rotor bow.

At step 508, the method monitors, records, and determines the temperature of the oil at a squeeze film damper of one or more bearings supporting the rotor 150. The temperature of the oil represents the amount of damping within the turbine engine 10. For an ideal temperature of the oil, there is more damping than for temperatures outside of the ideal temperature. The ideal temperature may be the temperature at which the squeeze film damper provides a predetermined damping effect. The amplification factor is lower the closer the oil is to the ideal temperature. The temperature of the oil may be measured at the squeeze film damper or at the oil tank that provides oil to the squeeze film damper.

At step 510, the method 500 incorporates the magnitude of vibration and the phase of the vibration determined by the method 400 (or other methods described herein) to determine the non-thermal rotor unbalance. That is, the step 510 imports the output from step 412 of the method 400. Although illustrated in sequential order, step 504, step 506, step 508, and step 510 may be performed in any order or simultaneously.

At step 512, the method 500 employs the data from all of steps 504 to 510 to compute an amplification factor and vibration requirement. The amplification factor represents how much the unbalance is amplified when the rotor 150 passes through the bowed rotor mode and is a function of, for example, rotor mass, rotor stiffness, stiffness of bearings and boundary conditions, and damping. That is, when passing through the bowed rotor mode, the engine response (e.g., vibration, clearance closure) due to the thermal rotor bow and the non-thermal rotor unbalance is amplified. The vibration requirement represents how low the vibration magnitude level needs to be in order for the turbine engine to safely pass through the bowed rotor mode. When determining the amplification factor and vibration requirement at step 512, the data gathered and computed earlier in the method 500 are considered and their effect on the amplification factor is accounted for when determining the amplification factor. Thus, the computation at step 512 accounts for both thermal effects on rotor bow and non-thermal effects on rotor bow. At step 514, the computation from step 512 is then used to determine if motoring is required and, if so, for how long. This is based, in part, on the amplification factor and the vibration requirement. As described in more detail to follow, the motoring algorithm will continue to motor the turbine engine until the measured vibration drops to the level of the vibration requirement (or, in some examples, until the algorithm times out).

At step 514, the method determines whether motoring is required to mitigate the bowed condition (e.g., due to thermal rotor bow or non-thermal rotor unbalance) and, if so, the step 514 determines a time period for the length of the motoring. Motoring refers to slowly rotating the rotor 150 as the turbine engine 10 is initiated. The time period for which the turbine engine 10 motors is determined based on the aforementioned computation at step 512.

Motoring can mitigate thermal rotor bow. As the rotor 150 rotates, the temperature will be distributed through the rotor 150 and begin to even out or approach equilibrium. Since the rotor 150 is not static, the hotter top side 152 (FIG. 2A) is rotating about the longitudinal centerline axis 12 that works to distribute the heat and allow the temperature within the turbine engine 10 to even out between the top and the bottom (from the perspective of the ground surface 88). As the temperature evens out, the thermal rotor bow will dissipate since the temperature within the rotor 150 becomes more evenly distributed through the rotor 150.

Extended motoring during the start of the engine is used to allow the thermal rotor bow to dissipate, or to decay, avoiding high vibration and clearance closures when the rotor passes through the bowed rotor mode (i.e., the rotor first bending mode). The length of the motoring time can be adjusted based on thermal conditions and the estimated thermal bow present in the engine, as well as the non-thermal effects mentioned herein. Motoring time requirements depend upon the dynamic amplification factor of the bowed rotor mode, as will be described in more detail with respect to step 512 and on the required level of the vibration requirement.

Four factors may affect whether motoring is required: (1) how large is the thermal rotor bow (e.g., steps 504 and 506), (2) how much damping is available (e.g., step 508), (3) how much non-thermal rotor unbalance is present (e.g., step 510), and (4) the phasing of the thermal rotor bow relative to non-thermal rotor unbalance (e.g., step 510). If the method at step 514 determines that motoring is not required, the method 500 continues to start operation of the turbine engine 10 at step 516. Motoring may not be required, for example, when the bowed condition of the rotor 150 is so low such that the rotor 150 is essentially in the straight condition, when the bowed condition of the rotor 150 is so low such that rotation of the rotor 150 during spooling up of the turbine engine 10 is sufficient to mitigate any existing rotor bow, when the bowed condition is below a predetermined acceptable level of vibration such that the rotor speed of the rotor 150 may pass through the bowed rotor mode without exhibiting vibrations and closures above a predetermined acceptable value, if sufficient damping is present in the squeeze film damper to accommodate expected vibrations, or combinations thereof. The predetermined acceptable value is selected such that, when the rotor 150 passes through the bowed rotor mode, damage to the engine or negative effects on the performance of the engine are limited or prevented.

The method 500, at step 514, also determines how long motoring is required. The time period for motoring at step 518 is based on the computation at step 512 and represents a time period that is sufficient to mitigate both thermal rotor bow such that rotation of the rotor 150 through the bowed rotor mode will not exhibit vibrations above the aforementioned predetermined acceptable value.

If the method at step 514 determines that motoring is required, then the method continues to step 518 to perform motoring of the turbine engine 10. The motoring at step 518 is performed at a rotational speed below the speed at which the rotor 150 passes through the bowed rotor mode. The motoring speed may be selected at an rpm that maxes out the available clearance closure. That is, for a particular engine, there is a predetermined available clearance closure. At or below this predetermined available clearance closure, no rubbing occurs between the rotor 150 and the surrounding component 156. Above the predetermined available clearance closure, rubbing occurs. The motor speed, therefore, may be selected to be at the predetermined available clearance closure. Selecting such a speed that maxes out the available clearance closure allows for the rotor 150 to be rotated at a high speed without passing through the bowed rotor mode and without allowing for rubbing between components, while allowing for an increased bowed rotor dissipation rate. The bowed rotor dissipation rate is a function of the speed of rotation of the rotor 150 such that the bowed condition of the rotor 150 dissipates faster when rotating the rotor 150 at faster speeds.

Before proceeding to start (e.g., step 516), that is, prior to operation of the turbine engine, two conditions must be met. The first condition is that the minimum motoring time has elapsed. At step 520, the method 500 monitors the time of motoring and, if the minimum motoring time has elapsed ("Yes"), the method moves to step 522. If the minimum motoring time has not elapsed ("No"), the method continues to motor until the minimum motoring time has elapsed. The minimum motoring time may be predetermined based on the type of engine, or based on historical data for the particular engine, or a combination of both.

Once the minimum motoring time is met (the first condition), a second condition must also be met before proceeding to start (e.g., step 516). The second condition is that the vibration requirement must be met. The vibration requirement, as noted previously, is an acceptable vibration level in order for the turbine engine to safely pass through the bowed rotor mode. The vibration requirement, as determined at step 512, is the vibration requirement for the rotor 150 at the motoring speed and is a function of the amplification factor. The method 500, therefore, monitors the vibration of the rotor 150 at step 522 to determine if the vibration is at or below the acceptable vibration level (e.g., whether the vibration meets the vibration requirement). If the vibration is below the predetermined acceptable value ("Yes"), the engine may proceed to the start at step 516. As discussed above, the predetermined acceptable value is a value at which damage or rubbing is minimized or prevented when passing through the bowed rotor mode. That is, the vibration experienced by the rotor 150 as the rotor 150 passes through the bowed rotor mode is such that damage or rubbing is minimized, prevented, or limited. If the vibration is above a predetermined acceptable value ("No"), the vibration levels are still too high for the rotor 150 to pass through the bowed rotor mode. As such, the method continues motoring until a predetermined maximum time at step 524. Once the predetermined maximum time elapses ("Yes"), the method 500 proceeds to the start at step 516. The maximum motoring time is a function of what level of rub or damage would not affect operability of the turbine engine 10.

Proceeding to start, as described with respect to step 516, refers to proceeding to operation of the turbine engine. The operation of the turbine engine may occur as the initial operating process (e.g., with no prior engine operation) or for an in service turbine engine at various states. The in service turbine engine operation includes, for example, operation after a full shutdown and cool down of the turbine engine, operation before a cold start up, or operation at any point after a prior operation of the turbine engine, or any combination thereof.

The predetermined acceptable value may be specific to engine type and may be based on or a function of an amount of damping available and an amount of clearance available. For example, if there are small clearances between the rotor and the compressor (as described with respect to FIG. 2A), the rotor must be straighter as compared to a greater clearance. This is because there is less room for a bowed rotor to rotate within the clearance and to avoid rubbing the surrounding compressor. Additionally, for example, the predetermined acceptable value is a function of the vibration levels to which the engine has been designed.

Accordingly, the present disclosure provides for a method that mitigates thermal rotor bow while accounting for non-thermal rotor unbalance response effects when initiating the engine and prior to placing the engine in operation.

Stated another way, the data collected in the method 400 (FIG. 4) is used to adjust rotor bow mitigation (e.g., extended motoring) to compensate as needed. In examples when phasing is not monitored, the method 500 (FIG. 5) may increase motoring times to compensate for a "worst case" phasing of rotor bow and residual unbalance (e.g., in-phase alignment, such as described with respect to rotor 302 (FIG. 3)). In examples when phasing is monitored, the total non-thermal response (residual unbalance plus rotor bow) may be determined, and the mitigation motoring time tailored to suit the conditions of each start.

In other words, the present disclosure provides a method of estimating rotor residual unbalance and the effect this unbalance may have on the engine response in combination with thermal rotor bows, as well as a way for controlling the bowed rotor mitigation to minimize and to control engine start times, and to ensure engine hardware and components are adequately protected from the effects of an unmitigated bowed rotor start.

In rotors exhibiting both thermal rotor bows and high residual unbalances, the phasing of this unbalance with the thermal rotor bow may create a case when existing mitigation strategies are either not adequate to mitigate these effects (resulting in engine damage) or the mitigation is too conservative (resulting in, for example, extended motoring times that are excessively long). The present disclosure describes a method of quantifying the residual unbalance present in the rotor, and then using this information to optimize bowed rotor mitigation to avoid the inefficiencies described above.

The present disclosure therefore provides for quantification of residual unbalance to enable bowed rotor mitigation strategies that also account for unbalances in the rotor not due to thermal rotor bow. Monitoring vibration levels at the bowed rotor mode during engine shutdown or, alternatively, during cold engine starts where thermal rotor bows are not present, enables a direct measurement of residual rotor unbalance and quantifies the sensitivity of the rotor to this residual rotor unbalance specifically at the bowed rotor mode. By including residual unbalance in bowed rotor mitigation, the present disclosure allows for controlled and optimized (i.e., minimized) motoring times that are robust to changes in rotor vibration in fielded engines.

Further aspects are provided by the subject matter of the following clauses.

A method of mitigating rotor bow in a rotor of a turbine engine, the method comprising determining thermal rotor bow in the rotor, determining non-thermal rotor unbalance in the rotor by monitoring a response of the rotor at the bowed rotor mode of the rotor, determining a time period for motoring the rotor prior to operation of turbine engine, wherein the time period is based on a combination of the thermal rotor bow and the non-thermal rotor unbalance, and motoring the rotor for the time period and until the response of the rotor is below a predetermined acceptable value.

The method of the preceding clause, wherein determining the thermal rotor bow comprises monitoring one or more of exhaust gas temperature, combustor inlet temperature, ambient air temperature, or engine shutdown time.

The method of any preceding clause, wherein determining the non-thermal rotor unbalance comprises monitoring vibration of the rotor at the bowed rotor mode during a shutdown of the turbine engine.

The method of any preceding clause, wherein determining the non-thermal rotor unbalance comprises monitoring vibration of the rotor at the bowed rotor mode during a cold start of the turbine engine.

The method of any preceding clause, further comprising starting rotation of the turbine engine prior to determining the thermal rotor bow.

The method of any preceding clause, wherein determining the non-thermal rotor unbalance comprises initiating shutdown of the turbine engine, monitoring a rotor speed of the rotor, determining if the rotor speed is at the bowed rotor mode, and, if the rotor speed is within a predetermined speed range which includes the speed of the bowed rotor mode, recording a peak magnitude of vibration and a phase of vibration at the peak magnitude, and, if the rotor speed is not within the predetermined speed range which includes the speed of the bowed rotor mode, continuing to motor the rotor speed until the rotor speed is within the predetermined speed range which includes the speed of the bowed rotor mode, processing the peak magnitude of vibration and phase of vibration to produce an output, and completing shutdown of the turbine engine.

The method of any preceding clause, further comprising computing an amplification factor based on the thermal rotor bow and the non-thermal rotor unbalance, wherein the time period for motoring is a function of the amplification factor.

The method of any preceding clause, wherein the response is a vibration of the rotor, the method comprising monitoring vibration of the rotor to determine when the vibration of the rotor is below the predetermined acceptable value.

The method of any preceding clause, further comprising proceeding to operation of the turbine engine after the response is below the predetermined acceptable value.

The method of any preceding clause, further comprising proceeding to operation of the turbine engine after a predetermined maximum time even if the response is not below the predetermined acceptable value.

The method of any preceding clause, wherein the time period is greater when a phase of vibration is aligned with the thermal rotor bow than when a phase of vibration is not aligned with the thermal rotor bow.

The method of any preceding clause, wherein the response is a clearance closure between the rotor and an adjacent component, the method further comprising monitoring the clearance closure with a clearanceometer to determine when the clearance closure of the rotor is below the predetermined acceptable value.

The method of the preceding clause, wherein the adjacent component is a non-rotating component of a high pressure compressor.

The method of any preceding clause, wherein determining the non-thermal rotor unbalance comprises quantifying a mass eccentricity in the rotor.

The method of any preceding clause, wherein determining the non-thermal rotor unbalance comprises quantifying a permanent rotor deformation or a permanent rotor bow.

The method of any preceding clause, wherein determining the time period for motoring the rotor prior to operation of turbine engine is further based on a damper temperature.

The method of any preceding clause, wherein motoring comprises rotating the rotor at a rotational speed less than a rotational speed at which the rotor passes through the bowed rotor mode.

The method of any preceding clause, wherein the response of the turbine engine is a function of damper health.

The method of any preceding clause, further comprising determining a damping level of a squeeze film damper by monitoring a temperature of oil in the squeeze film damper.

The method of any preceding clause, wherein determining the non-thermal rotor unbalance comprises monitoring vibration of the rotor at the bowed rotor mode.

The method of the preceding clause, wherein monitoring vibration of the rotor at the bowed rotor mode comprises monitoring a magnitude of vibration of the rotor and a phase of the vibration of the rotor at the bowed rotor mode.

The method of any preceding clause, wherein monitoring one or more of exhaust gas temperature, combustor inlet temperature, and ambient air temperature comprises monitoring temperature at an engine location with a temperature sensor.

The method of any preceding clause, wherein monitoring vibration comprises monitoring vibration with an accelerometer located on an engine frame of the turbine engine.

The method of any preceding clause, wherein monitoring vibration comprises monitoring vibration with an accelerometer located on a forward bearing supporting a low-pressure shaft.

The method of any preceding clause, wherein determining non-thermal rotor unbalance comprises comparing a measured vibration in the rotor to a previously recorded vibration in the rotor based on prior shutdowns of the turbine engine.

The method of any preceding clause, wherein determining thermal rotor bow comprises comparing a temperature of the monitoring with historical data or experimental data of the turbine engine.

The method of any preceding clause, wherein monitoring the temperature of the oil comprises monitoring a temperature of the oil within an oil tank or a system supplying oil to the squeeze film damper.

The method of any preceding clause, wherein the non-thermal rotor unbalance is a function of mass eccentricity in the rotor.

The method of any preceding clause, wherein the non-thermal rotor unbalance is a function of a permanent bow in the shape of the rotor.

The method of any preceding clause, further comprising determining the dynamic amplification factor of the bowed rotor mode.

The method of any preceding clause, wherein the time period is based on the modal amplification factor.

The method of any preceding clause, wherein the response is a clearance closure, the method further comprising motoring the rotor until the clearance closure is below a predetermined acceptable value.

The method of any preceding clause, wherein the response is a vibration of the rotor, the method further comprising motoring the rotor until the vibration is below a predetermined acceptable value.

The method of any preceding clause, further comprising motor the rotor until the response is below a predetermined acceptable value.

The method of any preceding clause, further comprising monitoring the response of the rotor to determine when the response of the rotor is below the predetermined acceptable value.

The method of the preceding clause, wherein the monitoring comprises sensing parameters with one or more accelerometers, one or more clearanceometers, or a combination thereof.

A system for determining rotor bow mitigation configured to employ the method of any preceding clause.

A system for determining rotor bow mitigation in a rotor of a turbine engine, the system comprising one or more temperature sensors coupled to the turbine engine, one or more accelerometers coupled to the turbine engine, and a controller, having a processor and a memory, the controller configured to determine thermal rotor bow in the rotor based on a measurement from the one or more temperature sensors, to determine non-thermal rotor unbalance in the rotor at a bowed rotor mode of the rotor based on the one or more accelerometers, to determine a time period for motoring the rotor prior to operation of turbine engine based on the thermal rotor bow and the non-thermal rotor unbalance, and to motor the rotor for the time period and until a vibration of the rotor is below a predetermined acceptable value. A system having a turbine engine having a compressor section for compressing air flowing therethrough to provide a compressed air flow, a combustor including a combustion chamber, the combustion chamber configured to combust a mixture of a fuel flow and the compressed air flow to generate combustion products, a turbine section having at least one turbine driven by the combustion products, and a rotor rotated by the turbine section. The system having a controller having at least one processor and a non-transitory computer-readable storage medium having instructions stored which, when executed by the at least one processor, cause the at least one processor to perform operations comprising determining thermal rotor bow in the rotor, determining non-thermal rotor unbalance in the rotor by monitoring a response of the rotor at the bowed rotor mode of the rotor, determining a time period for motoring the rotor prior to operation of turbine engine, wherein the time period is based on a combination of the thermal rotor bow and the non-thermal rotor unbalance, and motoring the rotor for the time period and until the response of the rotor is below a predetermined acceptable value.

The system of the preceding clause, further comprising one or more accelerometers, the non-transitory computer-readable storage medium having additional instructions stored which, when executed by the at least one processor, determine non-thermal rotor unbalance in the rotor at a bowed rotor mode of the rotor The system of the preceding clause, further comprising one or more temperature sensors, the non-transitory computer-readable storage medium having additional instructions stored which, when executed by the at least one processor, determine the thermal rotor bow in the rotor.

The system of any preceding clause, the non-transitory computer-readable storage medium having additional instructions stored which, when executed by the at least one processor, monitors one or more of exhaust gas temperature, combustor inlet temperature, ambient air temperature, or engine shutdown time to determine thermal rotor bow.

The method of any preceding clause, The system of any preceding clause, the non-transitory computer-readable storage medium having additional instructions stored which, when executed by the at least one processor, monitors vibration of the rotor at the bowed rotor mode during a shutdown of the turbine engine to determine the non-thermal rotor unbalance.

The system of any preceding clause, the non-transitory computer-readable storage medium having additional instructions stored which, when executed by the at least one processor, monitors vibration of the rotor at the bowed rotor mode during a cold start of the turbine engine to determine the non-thermal rotor unbalance.

The system of any preceding clause, the non-transitory computer-readable storage medium having additional instructions stored which, when executed by the at least one processor, starts rotation of the turbine engine prior to determining the thermal rotor bow.

The system of any preceding clause, the non-transitory computer-readable storage medium having additional instructions stored which, when executed by the at least one processor, determines the non-thermal rotor unbalance by initiating shutdown of the turbine engine, monitoring a rotor speed of the rotor, determining if the rotor speed is at the bowed rotor mode, and, if the rotor speed is within a predetermined speed range which includes the speed of the bowed rotor mode, recording a peak magnitude of vibration and a phase of vibration at the peak magnitude, and, if the rotor speed is not within the predetermined speed range which includes the speed of the bowed rotor mode, continuing to motor the rotor speed until the rotor speed is within the predetermined speed range which includes the speed of the bowed rotor mode, processing the peak magnitude of vibration and phase of vibration to produce an output, and completing shutdown of the turbine engine.

The system of any preceding clause, the non-transitory computer-readable storage medium having additional instructions stored which, when executed by the at least one processor, compute an amplification factor based on the thermal rotor bow and the non-thermal rotor unbalance, wherein the time period for motoring is a function of the amplification factor.

The system of any preceding clause, the non-transitory computer-readable storage medium having additional instructions stored which, when executed by the at least one processor, monitors vibration of the rotor to determine when the vibration of the rotor is below the predetermined acceptable value.

The system of any preceding clause, the non-transitory computer-readable storage medium having additional instructions stored which, when executed by the at least one processor, initiates operation of the turbine engine after the response is below the predetermined acceptable value.

The system of any preceding clause, the non-transitory computer-readable storage medium having additional instructions stored which, when executed by the at least one processor, initiates operation of the turbine engine after a predetermined maximum time even if the response is not below the predetermined acceptable value.

The system of any preceding clause, wherein the time period is greater when a phase of vibration is aligned with the thermal rotor bow than when a phase of vibration is not aligned with the thermal rotor bow.

The system of any preceding clause, wherein the response is a clearance closure between the rotor and an adjacent component, and the non-transitory computer-readable storage medium having additional instructions stored which, when executed by the at least one processor, monitors the clearance closure with a clearanceometer to determine when the clearance closure of the rotor is below the predetermined acceptable value.

Stem The system of any preceding clause, wherein the adjacent component is a non-rotating component of a high pressure compressor.

The system of any preceding clause, wherein determining the non-thermal rotor unbalance comprises quantifying a mass eccentricity in the rotor.

The system of any preceding clause, wherein determining the non-thermal rotor unbalance comprises quantifying a permanent rotor deformation or a permanent rotor bow.

The system of any preceding clause, wherein determining the time period for motoring the rotor prior to operation of turbine engine is further based on a damper temperature.

The system of any preceding clause, wherein motoring comprises rotating the rotor at a rotational speed less than a rotational speed at which the rotor passes through the bowed rotor mode.

The system of any preceding clause, wherein the response of the turbine engine is a function of damper health.

The system of any preceding clause, further comprising determining a damping level of a squeeze film damper by monitoring a temperature of oil in the squeeze film damper.

The system of any preceding clause, wherein determining the non-thermal rotor unbalance comprises monitoring vibration of the rotor at the bowed rotor mode.

The system of the preceding clause, wherein monitoring vibration of the rotor at the bowed rotor mode comprises monitoring a magnitude of vibration of the rotor and a phase of the vibration of the rotor at the bowed rotor mode.

The system of any preceding clause, wherein monitoring one or more of exhaust gas temperature, combustor inlet temperature, and ambient air temperature comprises monitoring temperature at an engine location with a temperature sensor.

The system of any preceding clause, wherein monitoring vibration comprises monitoring vibration with an accelerometer located on an engine frame of the turbine engine.

The system of any preceding clause, wherein monitoring vibration comprises monitoring vibration with an accelerometer located on a forward bearing supporting a low-pressure shaft.

The system of any preceding clause, wherein determining non-thermal rotor unbalance comprises comparing a measured vibration in the rotor to a previously recorded vibration in the rotor based on prior shutdowns of the turbine engine.

The system of any preceding clause, wherein determining thermal rotor bow comprises comparing a temperature of the monitoring with historical data or experimental data of the turbine engine.

The system of any preceding clause, wherein monitoring the temperature of the oil comprises monitoring a temperature of the oil within an oil tank or a system supplying oil to the squeeze film damper.

The system of any preceding clause, wherein the non-thermal rotor unbalance is a function of mass eccentricity in the rotor.

The system of any preceding clause, wherein the non-thermal rotor unbalance is a function of a permanent bow in the shape of the rotor.

The system of any preceding clause, further comprising determining the dynamic amplification factor of the bowed rotor mode.

The system of any preceding clause, wherein the time period is based on the modal amplification factor.

The system of any preceding clause, wherein the response is a clearance closure, the method further comprising motoring the rotor until the clearance closure is below a predetermined acceptable value.

The system of any preceding clause, wherein the response is a vibration of the rotor, the method further comprising motoring the rotor until the vibration is below a predetermined acceptable value.

The system of any preceding clause, further comprising motor the rotor until the response is below a predetermined acceptable value.

The system of any preceding clause, further comprising monitoring the response of the rotor to determine when the response of the rotor is below the predetermined acceptable value.

The system of the preceding clause, wherein the monitoring comprises sensing parameters with one or more accelerometers, one or more clearanceometers, or a combination thereof.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A method of mitigating rotor bow in a rotor of a turbine engine, the method comprising:
   determining thermal rotor bow in the rotor;
   determining non-thermal rotor unbalance in the rotor by monitoring a response of the rotor at a bowed rotor mode of the rotor;
   determining a time period for motoring the rotor prior to operation of the turbine engine, wherein the time period is based on a combination of the thermal rotor bow and the non-thermal rotor unbalance; and
   motoring the rotor for the time period until the response of the rotor is below a predetermined acceptable value.

2. The method of claim 1, wherein determining the thermal rotor bow comprises monitoring one or more of exhaust gas temperature, combustor inlet temperature, ambient air temperature, or engine shutdown time.

3. The method of claim 1, wherein determining the non-thermal rotor unbalance comprises monitoring vibration of the rotor at the bowed rotor mode during a shutdown of the turbine engine.

4. The method of claim 1, wherein determining the non-thermal rotor unbalance comprises monitoring vibration of the rotor at the bowed rotor mode during a cold start of the turbine engine.

5. The method of claim 1, further comprising starting rotation of the turbine engine prior to determining the thermal rotor bow.

6. The method of claim 1, wherein determining the non-thermal rotor unbalance comprises:
   initiating shutdown of the turbine engine;
   monitoring a rotor speed of the rotor;
   determining if the rotor speed is at the bowed rotor mode, and,
      if the rotor speed is within a predetermined speed range which includes a speed of the rotor at the bowed rotor mode, recording a peak magnitude of vibration and a phase of vibration at the peak magnitude; and,
      if the rotor speed is not within the predetermined speed range which includes the speed of the rotor at the bowed rotor mode, continuing to motor the rotor speed until the rotor speed is within the predetermined speed range which includes the speed of the bowed rotor mode;
   processing the peak magnitude of vibration and phase of vibration to produce an output; and
   completing shutdown of the turbine engine.

7. The method of claim 1, further comprising computing an amplification factor based on the thermal rotor bow and the non-thermal rotor unbalance, wherein the time period for motoring is a function of the amplification factor.

8. The method of claim 1, wherein the response is a vibration of the rotor, the method comprising monitoring vibration of the rotor to determine when the vibration of the rotor is below the predetermined acceptable value.

9. The method of claim 1, further comprising proceeding to operation of the turbine engine after the response is below the predetermined acceptable value.

10. The method of claim 1, further comprising proceeding to operation of the turbine engine after a predetermined maximum time even if the response is not below the predetermined acceptable value.

11. The method of claim 1, wherein the time period is greater when a phase of vibration is aligned with the thermal rotor bow than when a phase of vibration is not aligned with the thermal rotor bow.

12. The method of claim 1, wherein the response is a clearance closure between the rotor and an adjacent component, the method further comprising monitoring the clearance closure with a clearanceometer to determine when the clearance closure of the rotor is below the predetermined acceptable value.

13. The method of claim 1, wherein determining the non-thermal rotor unbalance comprises quantifying a mass eccentricity in the rotor.

14. The method of claim 1, wherein determining the non-thermal rotor unbalance comprises quantifying a permanent rotor deformation or a permanent rotor bow.

15. The method of claim 1, wherein determining the time period for motoring the rotor prior to operation of the turbine engine is further based on a damper temperature.

16. The method of claim 1, wherein motoring comprises rotating the rotor at a rotational speed less than a rotational speed at which the rotor passes through the bowed rotor mode.

17. The method of claim 1, wherein the response of the turbine engine is a function of damper health.

18. The method of claim 1, further comprising determining a damping level of a squeeze film damper by monitoring a temperature of oil in the squeeze film damper.

19. The method of claim 1, wherein determining the non-thermal rotor unbalance comprises monitoring vibration of the rotor at the bowed rotor mode.

20. The method of claim 19, wherein monitoring vibration of the rotor at the bowed rotor mode comprises monitoring a magnitude of vibration of the rotor and a phase of the vibration of the rotor at the bowed rotor mode.

* * * * *